United States Patent
Xu et al.

(10) Patent No.: US 10,883,878 B2
(45) Date of Patent: Jan. 5, 2021

(54) FLUORESCENCE MEASUREMENT OF SAMPLES

(71) Applicant: Datacolor Inc., Lawrenceville, NJ (US)

(72) Inventors: Zhiling Xu, West Windsor, NJ (US); Michael H. Brill, Kingston, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 163 days.

(21) Appl. No.: 15/993,308

(22) Filed: May 30, 2018

(65) Prior Publication Data

US 2019/0368936 A1    Dec. 5, 2019

(51) Int. Cl.
*G01J 3/44* (2006.01)
*G01J 3/02* (2006.01)
*G01N 21/64* (2006.01)
*G01J 3/28* (2006.01)
*G01J 3/10* (2006.01)

(52) U.S. Cl.
CPC .......... *G01J 3/4406* (2013.01); *G01J 3/0229* (2013.01); *G01N 21/645* (2013.01); *G01J 2003/102* (2013.01); *G01J 2003/283* (2013.01); *G01J 2003/2826* (2013.01); *G01N 2021/6421* (2013.01); *G01N 2201/061* (2013.01)

(58) Field of Classification Search
CPC .. G01J 3/4406; G01J 3/0229; G01J 2003/283; G01J 2003/2826; G01J 2003/102; G01N 21/645
See application file for complete search history.

(56) References Cited

U.S. PATENT DOCUMENTS

| | | | |
|---|---|---|---|
| 9,726,597 B2 | 8/2017 | Sperling et al. | |
| 2007/0161876 A1* | 7/2007 | Bambot | G01J 3/027 600/310 |
| 2012/0300205 A1* | 11/2012 | Misener | G01J 3/28 356/317 |

(Continued)

OTHER PUBLICATIONS

Promotions, byk.com, "NEW specto2guide—Special Introduction Price, May 1, 2018", obtained from byk.com on Dec. 27, 2019 (Year: 2018).*

(Continued)

*Primary Examiner* — David P Porta
*Assistant Examiner* — Jeremy S Valentiner
(74) *Attorney, Agent, or Firm* — Leason Ellis LLP

(57) ABSTRACT

In accordance with particular implementations of the invention described herein, a sample for analysis is illuminated under each of one or more narrow-band light sources. The light incident upon this sample is received by a sensor that generates measurement data in response thereto. One or more processors are configured to receive the measurement data and derive an excitation response curve and a fluorescent response curve from the measurement data. The processor is further configured to generate a fluorescent profile value using measurements from the fluorescent response curve for each of the captured narrow band measurement data and an excitation profile value corresponding to the area under the fluorescence curve divided by the area under the excitation curve. The generated fluorescent profile and excitation profile are both output as a dataset providing improved measurement values over similar approaches in the art.

14 Claims, 6 Drawing Sheets

(56) References Cited

U.S. PATENT DOCUMENTS

2015/0260641 A1 9/2015 Sperling et al.
2016/0116410 A1* 4/2016 Blasinski ........... G01N 21/6456
                                                            702/189
2016/0334274 A1* 11/2016 Xu ........................ G01J 3/0254

OTHER PUBLICATIONS

Spectro2guide, BYK-Gardner GmbH, pp. 84-91, Year: 2018.
Paul N. Gardner Company Incorporated (Gardco), Spectro2Guide, Portable Spectrophotometers for Solid colors, ASTM D2244, E308, E1164 / DIN 5033, 5036, 6174 / DIN EN ISO 11664, 7 pages, Year: 2018.

* cited by examiner

FLUORESCENCE MEASUREMENT OF SAMPLES

FIELD OF THE INVENTION

The present invention is directed to apparatus, systems and methods for quantifying the fluorescence properties of a sample.

BACKGROUND OF THE INVENTION

Fluorescence plays an important role in many color samples. In a standard color measurement device, such as a spectrophotometer, a spectral sensor is integrated in the device, and thus the spectral information of a color sample can be obtained from the measurement. However, in currently available color measurement devices, only total spectral radiance can be measured. As such, data relating to the fluorescent properties of a sample cannot be separated from reflective or transmissive signal output by color measurement devices. More particularly, the total spectral radiance is strongly impacted by the spectral power distribution (SPD) of the illumination source provided by the color measurement device, and thus the fluorescence information obtained from a standard color measurement device is not accurate.

In order to fully characterize the fluorescence of a sample, expensive instruments such as spectrofluorometers are usually needed. Such devices are configured to measure the fluorescence of a sample, but are expensive to manufacture, thus keeping accurate fluorescence measurement devices out of reach for all but the most sophisticated customers.

Thus, there is a need in the art to measure color and fluorescence at the same time in a cost-efficient device. Likewise, what is needed is a device that provides accurate fluorescent data on a subject or sample while maintaining the typical cost of a standard color measurement instrument.

SUMMARY OF THE INVENTION

In one implementation, an apparatus, system, method and computer product are provided for determining the fluorescence of a sample. In accordance with particular implementations of the invention described herein, a sample for analysis is illuminated under each of one or more narrow-band light sources. The light incident upon this sample is received by a sensor that generates measurement data in response thereto. One or more processors are configured to receive the measurement data and derive an excitation response curve and a fluorescent response curve from the measurement data. The processor is further configured to generate a fluorescent profile value using the fluorescent response curve for each of the captured narrow band measurement data. The processor is also configured to generate an excitation profile value corresponding to the area under the fluorescence curve divided by the area under the excitation curve. The generated fluorescent profile and excitation profile are both output as a dataset providing improved measurement values over similar approaches in the art.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview and introduction, various embodiments of the apparatus, systems and methods described herein are directed towards the measurement of fluorescence properties of a sample using one or more color measurement devices. In a particular implementation, a method is provided to characterize a fluorescent sample by illuminating the sample with one or more narrow-band light sources and measuring the induced fluorescent signal with a spectra sensor. The method further provides (when possible) for separating the excitation wavelength range and the fluorescence wavelength range from the overall measurement data. Using these separated wavelength ranges, a more precise measurement of the fluorescence profile of a sample is obtained.

Figure 1:
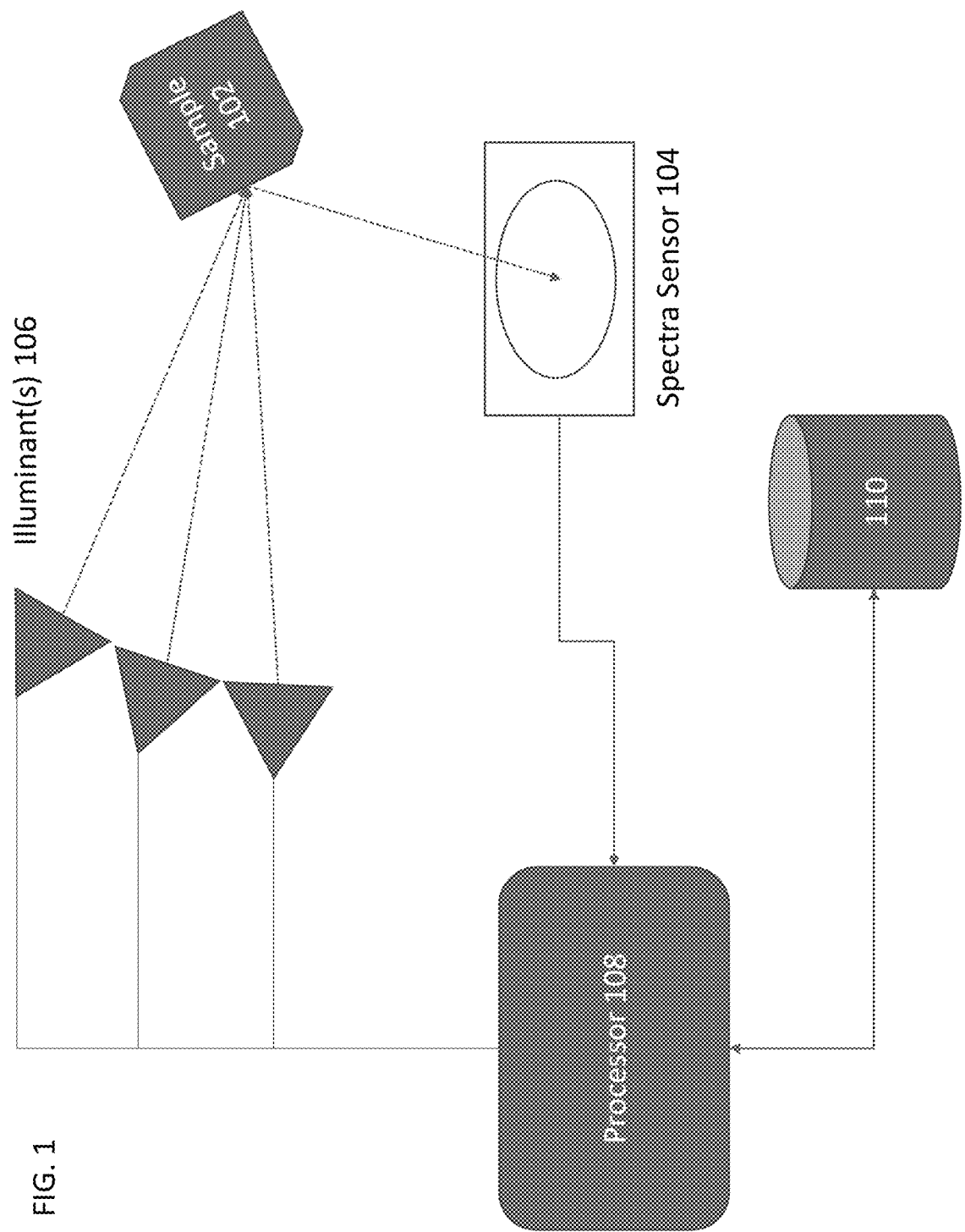
FIG. 1 illustrates a block diagram of a fluorescent measurement system according to one embodiment of the present invention.

As shown in FIG. 1, a sample 102 is provided. In a particular implementation, the sample 102 has fluorescent properties. For ease and simplicity of explanation, the sample 102 is depicted as a reflectance sample. However, it will be appreciated by those possessing an ordinary level of skill in the requisite art, that alternative samples are envisioned. For example, the sample 102 is a transmissive sample.

In one implementation, the color sample 102 is sample of a material under production having reflective or transmissive properties. For instance, the color sample 102 is a fabric sample such as fleece or fabric blends. In another implementation, the color sample 102 is a sheet of translucent or semi-translucent material. In yet a further implementation, the color sample 102 is an object or item integral to a larger structure or item, such as a dashboard of an automobile, or a section of wall of a structure. For example, the color sample 102 is a section or portion of stucco, carpe, building materials, housing, chassis, packaging, or another item.

With continued reference to FIG. 1, the sample 102 is placed such that the sample 102 can be illuminated by an illuminant(s) 106. In one implementation, the sample 102 is illuminated concurrently by one or more illuminant(s). In one implementation, the sample 102 is illuminated sequentially by one or more illuminant(s). By way of non-limiting example, the sample 102 is sequentially illuminated by three (3) or more illuminant(s). In a further implementation, the sample 102 is illuminated by eight (8) or more illuminant(s).

In a particular configuration, the illuminant(s) 106 are narrow-band lighting elements. For example, one or more illuminant(s) 106 provided in FIG. 1 are narrow band LEDs. Alternatively, one or more of the illuminant(s) 106 provided in FIG. 1 are broad-band LEDs equipped with one or more narrow band filters (not shown).

In one or more implementations, the illuminant(s) 106 are commercially available lighting sources. For instance, the illuminant(s) 106 are separate devices that are configurable to produce a light with certain spectral power distributions (SPD). For instance, the illuminant(s) 106 are one or more discrete light emitting elements, such as LEDs, OLEDs, fluorescent, halogen, xenon, neon, D65 light, fluorescent lamp, mercury lamp, Metal Halide lamp, HPS lamp, incandescent lamp or other commonly known or understood lighting sources.

In a particular implementation, the illuminant(s) 106 include one or more of a lens, filter, screen, enclosure, or other elements (not shown) that are utilized in combination with the light source of the illuminant(s) 106 to direct a beam of illumination, at a given wavelength, to the sample 102.

In one implementation, the illuminant(s) 106 are operable or configurable by an internal processor or other control circuit. Alternatively, the illuminant(s) 106 are operable or configurable by a remote processor or control device having one or more linkages or connections to the illuminant(s) 106. For example, as shown in FIG. 1, the processor 108 is connected to the illuminant(s) 106.

Continuing with FIG. 1, the illuminant(s) 106 are positioned relative to the sample 102 and a sensor 104 so as to provide a 45/0, d/8, or other illumination/pickup geometry combination. However, where the sample 102 is a transmissive sample, the orientation of the illuminant(s) 106 relative to the sample 102 is such that the light beam is directed though the sample 102 to the sensor 104.

As shown with reference to the dashed lines, light incident upon the sample 102 is captured or measured by a sensor 104. Here, the sensor 104 is a color sensor, measurement or capture device. For example, the sensor 104 is a scientific CMOS (Complementary Metal Oxide Semiconductor), CCD (charge coupled device), colorimeter, spectrometer, spectrophotometer, photodiode array, or other light sensing device and associated hardware, firmware and software. In one arrangement, the sensor 104 is configured to generate an output signal or data upon light being incident upon at least a portion of the surface of the sensor 104. By way of non-limiting example, the sensor 104 is configured to output a signal or data in response to light being incident upon one or more elements integral or associated with the color measurement device.

In one or more implementations, the sensor 104 is configured to generate a digital or analog signal that corresponds to the wavelength or wavelengths of light that are incident upon the sensor 104. In one or more configurations, the sensor 104 is configured to output spectral information, RGB information, or other multi-wavelength data representative of light reflected from, or transmitted through, the sample 102. In one non-limiting implementation, the sensor 104 is an element of a spectrometer, such as found in the 45G family of spectrometers manufactured by Datacolor Inc. of Lawrenceville, N.J.

In an alternative configuration, the sensor 104 is a light sensing component of a camera or image recording device. By way of further example, the sensor 104 is a light or color sensor integrated into a smartphone, tablet, cell phone, or other portable computing apparatus. In a further embodiment, the sensor 104 is integral to an "off the shelf" digital camera or web-camera connected or in communication with one or more computing devices.

In a particular configuration, the sensor 104 is configured with one or more microprocessors, or controllers that permit or control desired functionality. For instance, the sensor 104 is configured to communicate and exchange data or receive instructions from one or more local or remote computing elements, processors or computers. In a further implementation, the sensor 104 is configured to transmit one or more measurements made to a remote storage device 110 or processing platform, such as processor 108.

In one or more configurations, the sensor 104 is connected to processor or computer 108 through direct physical linkages, serial bus, or common interfaces, such as, but not limited to USB, FIREWIRE, Wi-Fi, Bluetooth, and other wired or wireless communication technologies suitable for the transmission data generated or output by the sensor 104.

One or more values, outputs, signals, or data generated by the sensor 104, are transmitted to one or more processor(s) 108 for evaluation. In one implementation, the processor 108 is coextensive, physically integrated, or otherwise provided within the same device, structure or housing, as the sensor 104. However, in another implementation, the processor 108 is remote or separate from the sensor 104 and any processors, computing elements or microprocessors associated therewith.

In one configuration, the processor 108 is configured through one or more software modules to generate, calculate, process, output or otherwise manipulate the output signal generated by the sensor 104.

In one implementation, the processor 108 is a commercially available computing device. For example, the processor 108 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 108 can comprise a single processor, multiple discrete processors, a multi-core processor, or other type of processor(s) known to those of skill in the art, depending on the particular embodiment. In a particular example, the processor 108 executes software code on the hardware of a custom or commercially available cellphone, smartphone, notebook, workstation or desktop computer configured to receive data or measurements captured by the sensor 104 either directly, or through a communication linkage.

The processor 108 is configured to execute a commercially available or custom operating system, e.g., MICROSOFT WINDOWS, APPLE OSX, UNIX or Linux based operating system in order to carry out instructions or code.

In a particular implementation, the processor 108 is a computer, workstation, thin client or portable computing device such as an Apple iPad/iPhone® or Android® device or other commercially available mobile electronic device configured to receive and output data to or from database 108 and or sensor 104. Here, the processor 108 communicates with a display device for displaying data as well as input hardware to permit a user to access information, and to send commands and/or instructions to the processor 108 and the color measurement device. In one or more implementations, the display device is a screen, monitor, display, LED, LCD or OLED panel, augmented or virtual reality interface or an electronic ink-based display device.

In one or more implementations, the processor 108 is further configured to access various peripheral devices and network interfaces. For instance, the processor 108 is configured to communicate over the internet with one or more remote servers, computers, peripherals or other hardware using standard or custom communication protocols and settings (e.g., TCP/IP, etc.).

The processor 108 may include one or more memory storage devices 105 (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 108 provides for the storage of application program and data files. One or more memories provide program code that the processor 108 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 108 provides for storage of an application program and data files when needed.

The processor 108 is configured to store data either locally in one or more memory devices. Alternatively, the processor 108 is configured to store data, such as raw measurement data or processing results, in a local or remotely accessible database 110. The physical structure of the database 110 may be embodied as solid-state memory (e.g., ROM), hard disk drive systems, RAID, disk arrays, storage area networks ("SAN"), network attached storage ("NAS") and/or any other suitable system for storing computer data. In addition, the database 110 may comprise caches, including database caches and/or web caches. Programmatically, the database 110 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 110 includes the necessary hardware and software to enable the processor 108 to retrieve and store data within the database 110.

In one implementation, each element provided in FIG. 1 is configured to communicate with other elements through one or more direct connections, such as though a common bus. Alternatively, each element is configured to communicate with the others through network connections or interfaces, such as a local area network LAN or data cable connection. In an alternative implementation, the sensor 104, processor 108, and database 110 are each connected to a network, such as the internet, and are configured to communicate and exchange data using commonly known and understood communication protocols.

Those possessing an ordinary level of skill in the requisite art will appreciate that additional features, such as power supplies, power sources, power management circuitry, control interfaces, relays, interfaces, and/or other elements used to supply power and interconnect electronic components and control activations are appreciated and understood to be incorporated.

Figure 2A:
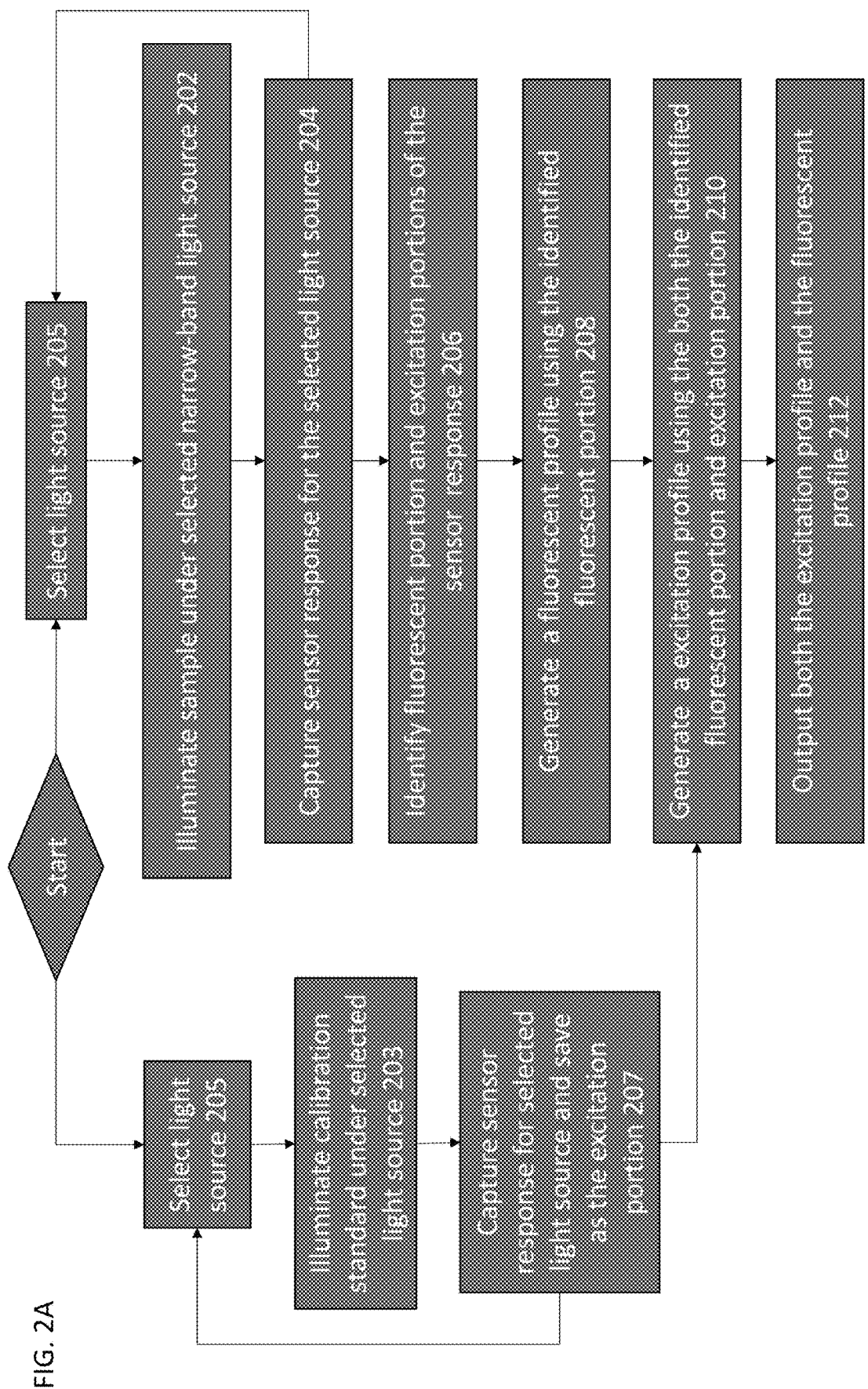
FIG. 2A presents a flow diagram detailing the steps taken in one embodiment of the fluorescent measurement system.
Figure 2B:
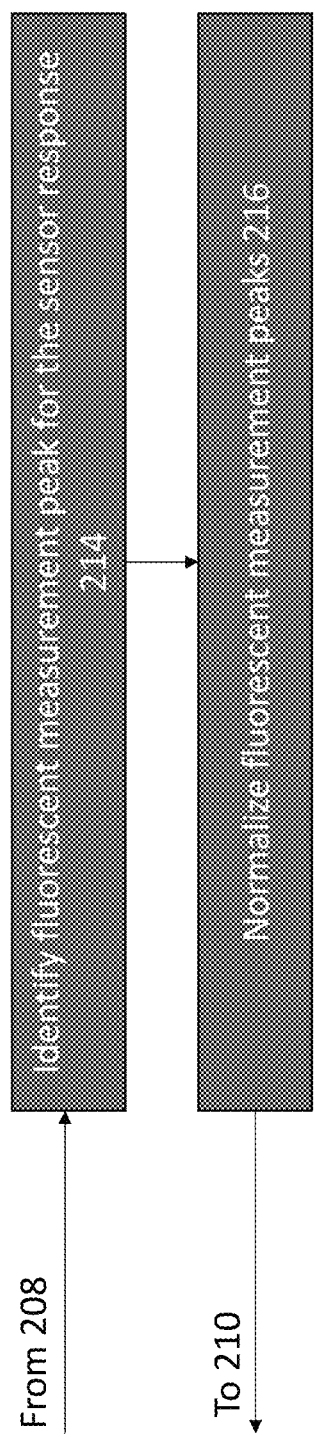
FIG. 2B presents a flow diagram detailing additional steps taken in one embodiment of the fluorescent measurement system.
Figure 3:
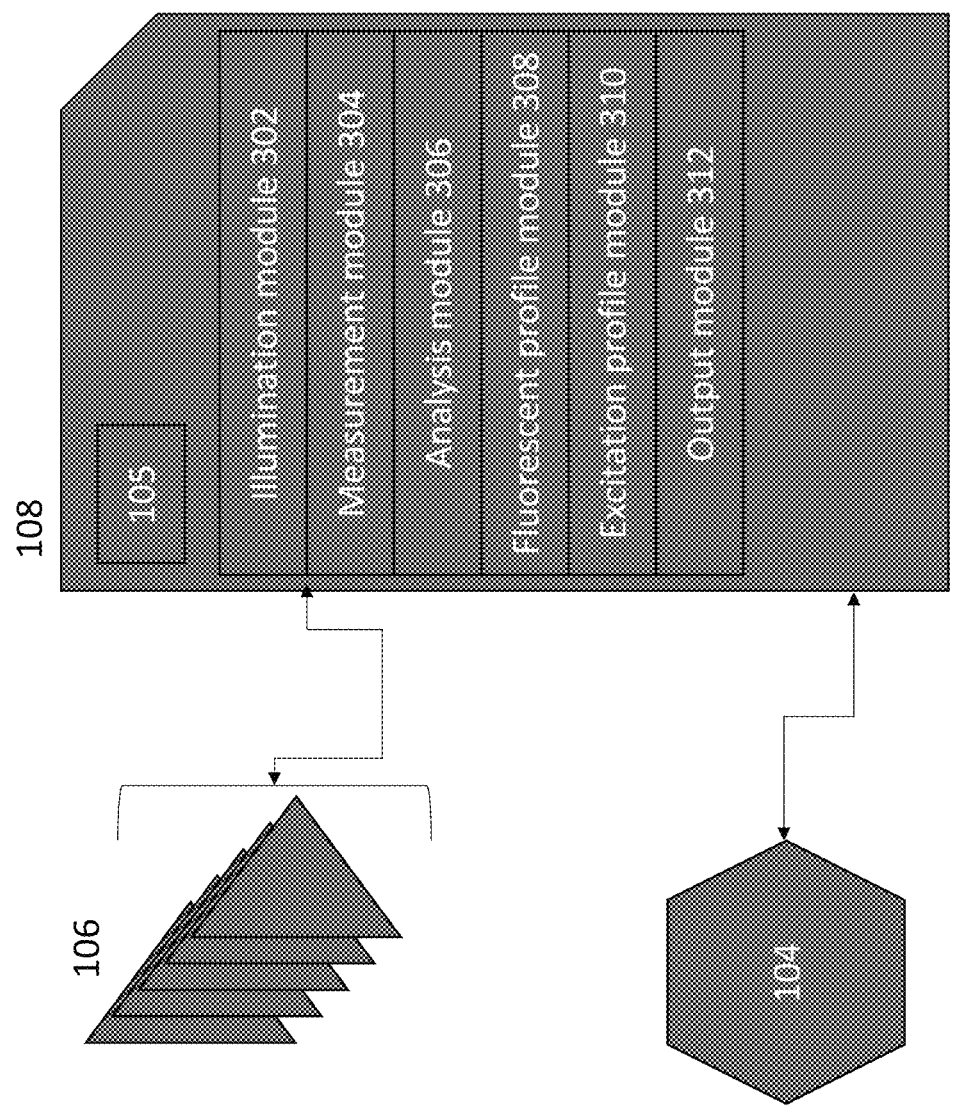
FIG. 3 presents a collection of modules detailing the operative functions of the fluorescent measurement system according to one embodiment of the present invention.

Provided FIGS. 2A and 3 detail an overview of the apparatus, system, method and computer products described herein. Particularly, FIGS. 2A and 3 detail the measurement of a sample 102 illuminated by one or more illuminant(s) 106. Light that has interacted with the sample 102 (such as via reflection or transmission) is then incident upon one or more elements of the sensor 104. In turn the sensor causes an output signal or data to be generated and passed to the processor 108.

With particular reference to FIG. 2A, an illuminating step 202 is provided. The illuminating step 202 includes, in one implementation, selecting one or more narrow band light sources from the available illuminant(s) 106 and causing the activation thereof.

For example, utilizing an illumination module 302, the processor 108 is configured to illuminate the sample 102. Here, one or more electrical signals generated by the processor 108 causes one of the illuminant(s) 106 to activate, thereby sending light of a given spectral power distribution ("SPD") to the sample 102. In a particular configuration, one or more illumination modules 302, configured as code executing within the processor 108 configure the processor 108 to activate the desired illuminant(s) 106. In one or more configurations, the illuminant(s) 106 is a narrow-band light source, broad-band light source equipped with one or more filter elements, or a light source that includes multiple sub-lighting elements, each capable of emitting a light with a given SPD. For example, one or more submodules of the illumination module 302 configures the processor 108 to select the desired wavelength or light source available to the illuminant(s) 106.

In one implementation, the illumination module 302 is configured to select the illuminant(s) 106 based on user input or other information regarding the sample 102. For example, upon receiving user input regarding the type, nature or category of sample 102, the processor 108 automatically selects one or multiple illuminant(s) from the available illuminant(s) 106 to illuminate the sample 102.

Upon illumination by the first illuminant(s) 106, the light returned from the sample 102 is directed to the sensor 104. In response to light incident upon the sensor 104, a signal or output is generated that includes information about the sample 102 under analysis. The output or signal is received by the processor 108 as in step 204.

Here, a measurement module 304 configures a processor 108 to capture or record the output of the sensor 104. In one implementation, the output captured by the processor 108, configured by a measurement module 304, is composed of a pixel data array, analog signal (or signals), digital data stream, data file, serial encoding, binary data, or other information suitable to contain information about the light that has been incident upon the sample 102 and received by the sensor 104.

In a further implementation, one or more submodules of the measurement module 304 configures the processor 108 to convert, format or otherwise condition the data received from the sensor 104. For example, a submodule of the measurement module 304 converts the data from a raw binary data stream to a digital file.

In a particular implementation, the data captured by the sensor 104 is stored within a memory of the processor 108. Alternatively, the data relating to the measurements made of the sample 102 under any of the illuminant(s) 106 are stored on a remote database 110 for later retrieval or processing. In yet a further implementation, data regarding the specific make, model, brand, and settings of the sensor 104 are stored along with the measurement data.

In a further implementation, the characteristics of the illuminant(s) 106 are also stored along with the measurement data. For instance, the processor 108 is configured to activate the illuminant(s) 106 in order to record measurement data output by the sensor 104 and access the properties of the illuminant(s) 106 used. One or more submodules of the data capture module 304 configure the processor 108 to access data regarding the activated illuminant(s) 106 from a lookup table or database of illuminants. Through one or more additional submodules of the measurement module 304, the processor 108 is configured to associate the characteristics of the specified illuminant(s) 106 with the relevant measurement data.

In one or more configurations where the illuminant(s) 106 are activated sequentially, as opposed to in parallel, the processor 108 is also configured by one or more submodules of the illumination module 302 to activate an additional illuminant(s) 106 as shown in step 205. Here, the processor 108 is configured by one or more modules cooperating with one another to determine the appropriate or desired illuminant(s) 106. For example, user input configures the processor 108 to select a given illuminant(s) 106 based on the type of material under analysis. Once the measurements under a first illuminant 106 have been made and the illuminant is deactivated, a second illuminant is activated as in step 205. Here, upon illumination of the sample 102 under the second illuminant, the processor 108 is configured by the measurement module 304 to obtain the output of the sensor 104 using the second illuminant. In one or more particular implementations, further illuminants are used to capture additional data relating to the sample 102 under different wavelengths. In this arrangement, the processor 108 is configured to return to step 202 and proceed to step 204 until the sample 102 has been illuminated under each of the desired illuminant(s) 106.

Using the measurement data obtained under the illuminant(s) 106, the fluorescent profile of a sample 102 can be determined. For continued ease of explanation, the following steps and data analysis is conducted on a dataset of sensor measurement data obtained for a sample illuminated using eight (8) groups of narrow-band LEDs. However, those possessing an ordinary level of skill in the requisite art will appreciate that alternative configuration and numbers of illuminant(s) can be used in accordance with the foregoing.

Figure 4:
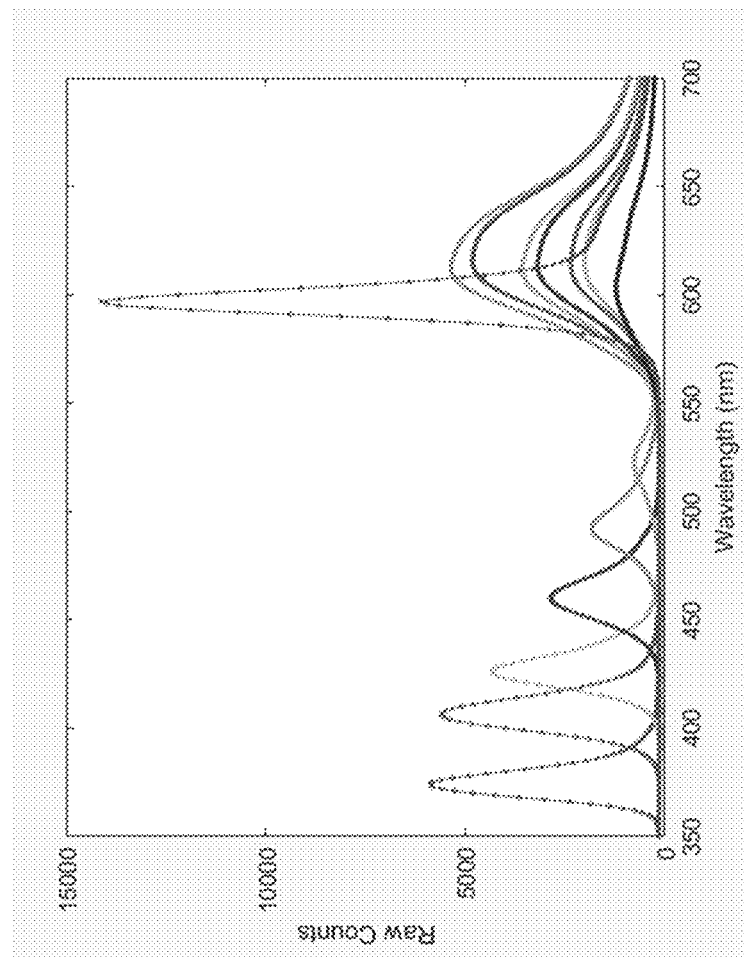
FIG. 4 is a chart detailing the spectral power distribution of eight (8) illuminants in accordance with one embodiment of the present invention.

With specific reference to FIG. 4, the data captured in step 204 is provided as a 2d-plot showing the raw count and the wavelength (nm) of the sensor 104 response to receiving light incident on the sample 102. As shown, for each channel (e.g. illuminant 106) the excitation wavelengths are within the range of 350 nm~550 nm, the fluorescent responses are in the 550 nm 700 nm range.

The processor 108 is configured by the analysis module 306 to identify the difference between the response data corresponding to the excitation portion of the response data and data corresponding to the fluorescent portion of the response data. In one particular implementation, as shown in step 206, the processor 108 configured by the analysis module 306 provides a threshold value used to segregate or identify measurements that are in an excitation or fluorescent band. For example, the wavelength range of the whole investigation (e.g. the range of response generated by sensor 104) is enumerated by 1, 2, . . . k; then the excitation band is characterized as 1, 2, . . . , m, where m<k; and the fluorescence band can be characterized as m+1, m+2, . . . , k. In alternative configurations, one or more data analysis techniques, such as pattern matching, machine learning, neural networks, or other algorithms commonly used and understood are implemented by the processor 108 configured by the analysis module 306 to identify the fluorescent band and the excitation band data.

Once the fluorescent band has been identified, a fluorescent profile is derived or calculated, as in step 208. In one non-limiting implementation, the processor 108 is configured by the fluorescent profile module 308 to carry out generating of the fluorescent profile provided in step 208. Turning to FIG. 3B, in one implementation, the processor 108 is configured by one or more submodules of the fluorescent profile module 308 to identify the measurement peak (e.g. highest number of raw counts) for each illuminant(s) 106 measured. As shown, step 214 includes accessing the measurement data contained within the fluorescent band and identifying for each illuminant(s) channel the wavelength where the largest number of raw counts was obtained. Furthermore, turning to step 216, once the peaks have been identified, the measurements are normalized at their peaks. The normalized peak value for the illuminant(s) channels can, in one further implementation, be stored in a working memory of the processor 108. Alternatively, the normalized measurement values are stored in a local or remote database 110 for further use.

Turning to step 210, an excitation profile is also generated using at least the measurement data provided in step 206. For instance, the processor 108 is configured by an excitation profile module 310 to generate an excitation profile using both the fluorescent band and excitation band data. In a further configuration, the excitation profile is also generated using the excitatory portion of the sensor response for the calibration standard obtained in step 207 (described in more detail herein).

For example, the processor 108 is configured by the excitation profile module 310 to define a profile factor at the center wavelength of each illuminant(s) 106 channel as the area under the fluorescence curve divided by the area under the excitation curve for each illuminant(s) 106. For instance, the excitation profile module 310 configures the processor 108 to evaluate the measurement data according to equation (1):

$$\eta = \int I_{fluo} d\lambda / \int I_{excit} d\lambda \qquad (1)$$

where $I_{fluo}$ is the light intensity defined in the portion of the total investigation range identified (as in step 206) as the fluorescent band, and $I_{excit}$ is the light intensity defined in the portion of the range representing the excitation band.

The input light spectrum $I_{excit}$ in Eq. 1 is obtained in one or more implementations, using a sensor 104 that has been calibrated using a calibration standard. It will be appreciated that when sensor 104 obtains measurements directly from the sample, the absorption and fluorescence properties of the sample 102 will consume some of the excitation light energy. As such, the remaining excitation light energy reaching the sample channel of sensor 104 does not accurately capture the spectrum of the incident light. By calibrating the sensor 104 using a calibration standard, the true excitation light energy incident onto the sample is recovered.

In an alternative configuration, the illumination module 302 is used to illuminate a calibration standard under one or more illuminants as shown in step 203. In a further configuration, the light reflected from the calibration standard is captured by the sensor 104 and the sensor response output by the sensor 104 is stored for further use, as in step 207. This process can be repeated until each desired illuminant has illuminated the calibration sample. In a particular implementation, the stored sensor response corresponds to only the excitation portion of the raw sensor measurement for a given illuminant.

In one or more implementations, the calibration standard used is a reference matte sample, as shown in step 203 of FIG. 2A. The sensor response when measuring the calibration standard is corrected or compensated in order to provide a sensor response that corresponds to a pre-determined or desired response. For example, the sensor response is corrected or compensated such that when a reference matte sample is measured, the output response corresponds to a measurement response expected when measuring a perfect reflecting diffuser, as shown in step 207. In one or more implementations, the reference matte sample is a diffuse white reference standard.

In a specific implementation, the excitation profile is calculated by a processor 108 configured by the excitation profile module 310, according to the following approach. Where the wavelength of the whole investigation range is set by 1, 2, ... k; the excitation band is defined as 1, 2, ..., m, where m<k; and the fluorescence band is defined as m+1, m+2, ..., k. Thus, for a given fluorescent sample, the reflectance at each wavelength can be named as p1, p2, ..., pk, the fluorescence at each wavelength can be named as f1, f2, ..., fk, and excitation quantity at each wavelength can be named as e1, e2, ..., ek. If $[I_{in1}, \ldots, I_{ink}]$ is input spectrum reflected from a calibration standard corrected to perfect reflecting diffuser, and $[I_{out1}, \ldots, I_{outk}]$ is output spectrum from test sample, then the following holds:

$$\begin{bmatrix} I_{out1} \\ \vdots \\ I_{outk} \end{bmatrix} = \left\{ \begin{bmatrix} \begin{pmatrix} p_1 & \cdots & 0 \\ \vdots & \ddots & \vdots \\ 0 & \cdots & p_k \end{pmatrix} \end{bmatrix} + \begin{bmatrix} f_1 \\ \vdots \\ f_k \end{bmatrix} [e_1 \ \cdots \ e_k] \right\} \begin{bmatrix} I_{in1} \\ \vdots \\ I_{ink} \end{bmatrix} \qquad (2)$$

When the excitation band and the fluorescence band are separated, and we arrange that $I_{inu}$ is nonzero only for the excitation band u<m+1, then $$\begin{bmatrix} p_1 I_{in1} \\ \vdots \\ p_m I_{inm} \\ 0 \\ \vdots \\ 0 \end{bmatrix} + \begin{bmatrix} 0 \\ \vdots \\ 0 \\ f_{m+1} \\ \vdots \\ f_k \end{bmatrix} [e_1 \ \cdots \ e_m \ 0 \ \cdots \ 0] \begin{bmatrix} I_{in1} \\ \vdots \\ I_{inm} \\ 0 \\ \vdots \\ 0 \end{bmatrix} = \begin{bmatrix} I_{out1} \\ \vdots \\ I_{outk} \end{bmatrix} \qquad (3)$$

Thus, after removing the first m equations in the above set, k–m fluorescence related equations remain for the sample:

$$\begin{bmatrix} f_{m+1} \\ \vdots \\ f_k \end{bmatrix} [e_1 I_{in1} + \ldots + e_m I_{inm}] = \begin{bmatrix} I_{outm+1} \\ \vdots \\ I_{outk} \end{bmatrix} \qquad (4)$$

For monochromatic light $I_{inu}$ at excitation wavelength u, we can get from equation (4)

$$\begin{bmatrix} f_{m+1} \\ \vdots \\ f_k \end{bmatrix} e_u I_{inu} = \begin{bmatrix} I_{outu\,m+1} \\ \vdots \\ I_{outu\,k} \end{bmatrix} \qquad (5)$$

In this equation, $$\begin{bmatrix} f_{m+1} \\ \vdots \\ f_k \end{bmatrix} \text{ and } \begin{bmatrix} I_{outu\,m+1} \\ \vdots \\ I_{outu\,k} \end{bmatrix}$$

have the same profile with different magnitude, so we can calculate fluorescence excitation quantity as $$e_u = \frac{1}{I_{inu}} \frac{\max(I_{outu})}{\max(f)} \qquad (6)$$

where the maximum in each case is over the fluorescent output wavelengths m+1 to k. Since the magnitude of f is arbitrary, we can normalize f to let its peak be 1, and then equation (6) becomes $$e_u = \frac{\max(I_{outu})}{I_{inu}} \qquad (7)$$

In practice, as in the example of LED light source, the excitation light is not strictly monochromatic, instead, it is narrow band with a certain wavelength range. By way of further clarification, those skilled in the art will appreciate that narrow-band light as a light that contains power in the sample's excitation band but not in its fluorescence band. Furthermore, a plurality of narrow-band light are such that the emission bands of the lights do not overlap. Therefore, integration of measured fluorescent signal and the integration of measured excitation signal can be used to define the excitation quantity, as in equation (1) and re-written here:

$$\eta = \int I_{fluo} d\lambda / \int I_{excit} d\lambda \qquad (8)$$

Thus, $I_{excit}$ is obtained from the measurement of a sample 102 using a sensor 104 calibrated with the diffuse white reference standard. In a particular implementation, $I_{excit}$ is obtained using a sensor that has been calibrated according to the calibration calculations described in equation (2) through (8). However, in one or more alternative implementation, $I_{excit}$ is measured by a sensor that has been calibrated with a different type, nature or color reference standard.

Figure 5:
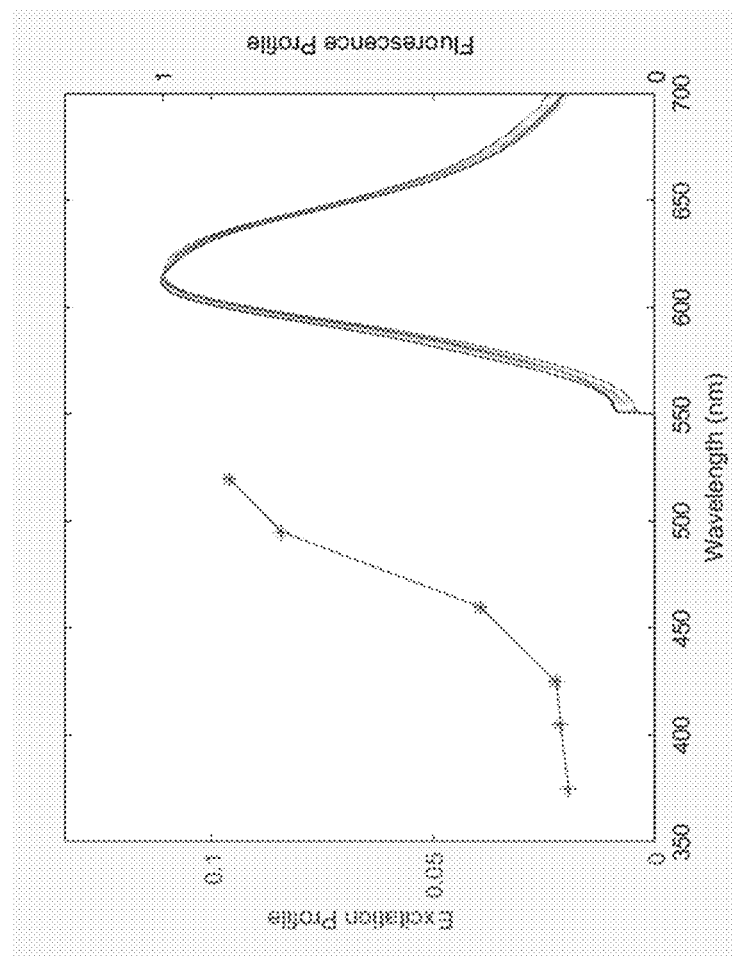
FIG. 5 is a chart detailing the fluorescent and excitations profiles generated in accordance with one aspect of the present invention.

As shown in FIG. 5, the fluorescence profile at the right side of the plot provides the fluorescent spectra of the measured sample according to step 208, and the excitation profile at the left side of the plot shows the excitation quantity of the measured sample at the center of each excitation channel as define by equation (1) according to step 210. With these two profiles, the fluorescent properties of the sample 102 can be better understood.

Furthermore, once data as provided according to equation (1) and step 208 have been generated, the processor 108 is configured by an output module 312 to store the generated excitation profile and fluorescent profile to a local or remote database, and/or to generate on a display, as in step 212.

In a further configuration, prior to conducting steps 202-212, the sensor 104 of the above-system can be calibrated with a broadband light source and a reference instrument in order to ensure that the proper response of each wavelength in the whole wavelength range is generated. For example, without such a calibration, the measured fluorescence profile can be distorted.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A method of determining the fluorescence of a sample, the method comprising:
    illuminating a calibration reference under one or more narrow-band light sources, each of the one or more narrow-band light sources configured to emit light that contains power in an excitation band, but not in a fluorescence band, of the sample;
    capturing, with a light sensing device, illumination measurement data of the calibration reference under the one or more narrow-band light sources;
    illuminating the sample under analysis under each of the one or more narrow-band light sources;
    capturing, with the light sensing device, sample measurement data of light from each of the one or more narrow-band light sources that has illuminated the sample, wherein the sample measurement data includes at least an excitation response curve, where the excitation response curve includes the sample measurement data and the-illumination measurement data, and a fluorescent response curve under each of one or more narrow-band light sources;
    generating a fluorescent profile value using the fluorescent response curve of the measurement data, by obtaining the area under the fluorescence response curve divided by the area under the excitation response curve;
    calculating an excitation profile value using the excitation response curve and the fluorescent response curve; and
    outputting both the fluorescent profile and the excitation profile.

2. The method of claim 1, wherein the step of generating the fluorescent profile further includes normalizing the fluorescent response curve for each of the one or more narrow-band light sources at their respective peaks to form a fluorescent spectrum.

3. The method of claim 1, where the excitation profile $\eta$ is a function of the center wavelength $\lambda$ of the narrow-band excitation light generated according to:

$$\eta(\lambda) = \int I_{fluo} d\lambda / \int I_{excit} d\lambda,$$

where $\int I_{fluo} d\lambda$ is the area under the fluorescence response curve and $\int I_{excit} d\lambda$ is the area under the excitation response curve, where area is the wavelength integral of the respective response curve.

4. The method of claim 1, wherein the sample is one of a transmissive sample or a reflectance sample.

5. The method of claim 1, wherein the step of outputting the fluorescent profile and the excitation profile further includes displaying the fluorescent profile and the excitation profile on a display device.

6. The method of claim 5, wherein displaying the fluorescent profile and the excitation profile includes plotting the fluorescent profile and the excitation profile on a 2-dimensional chart.

7. The method of claim 1, wherein at least one of the light sources is configured as a broad-band source equipped with one or more narrow band filters.

8. The method of claim 1, wherein the calibration reference is a diffuse white reference standard having known reflectance values and the light sensing device is a spectral sensor.

9. The method of claim 8, where further comprising the step of:
separating the excitation wavelength range and the fluorescence wavelength range from the illumination measurement data.

10. A system for determining the fluorescence of a sample, the system comprising:
a plurality of light sources configured to illuminate the sample;
a sensor configured to receive light that has been incident upon the sample and to output a data in response thereto;
a processor having a memory, and configured by one or more modules to:
receive output data from the sensor;
generate data corresponding to an excitation response curve and a fluorescent response curve from the received data;
determine a fluorescent profile value using the generated fluorescent response curve data;
calculate an excitation profile value by obtaining the area under the fluorescence response curve divided by the area under the excitation response curve; and
output both the fluorescent profile and the excitation profile.

11. The system of claim 10, wherein the sample is one of a transmissive sample or a reflectance sample.

12. The system of claim 10, wherein the processor is further configured to calculate the fluorescent profile by normalizing the fluorescent response for each illuminant at their respective peaks to form a fluorescent spectrum.

13. The system of claim 10, where the excitation profile is a function of the center wavelength $\lambda$ of the narrow-band excitation light generated according to:

$$\eta(\lambda) = \int I_{fluo} d\lambda / \int I_{excit} d\lambda,$$

where $\int I_{fluo} d\lambda$ is the area under the fluorescence curve and $\int I_{excit} d\lambda$ is the area under the excitation curve where area is the wavelength integral of the respective response curve.

14. The system of claim 13, where the sensor is calibrated by:
capturing a narrow-band measurement data of a known value reference standard under the one or more narrow-band lights; and
adjusting the sensor response to output a value that matches the expected value of the reference standard.

* * * * *